United States Patent

Baradat

[11] Patent Number: 6,164,466
[45] Date of Patent: Dec. 26, 2000

[54] BUTCHER'S CART WITH REMOVABLE MODULES FOR TRANSPORTING MEAT

[75] Inventor: Guy Baradat, Pau, France

[73] Assignee: Aquitaine Fluide, Serres-Castet, France

[21] Appl. No.: 09/159,591

[22] Filed: Sep. 24, 1998

[51] Int. Cl.[7] .............................. A22C 15/00; A47F 7/00; A47B 47/03

[52] U.S. Cl. ...................... 211/186; 211/113; 211/133.1; 211/189; 211/85.4; 452/187

[58] Field of Search ........................... 280/79.3; 211/113, 211/133.1, 132.1, 186, 189, 85.4; 452/187

[56] References Cited

U.S. PATENT DOCUMENTS

| | | | |
|---|---|---|---|
| D. 137,714 | 4/1944 | Pautz | D8/367 |
| 1,620,313 | 3/1927 | Abele | 211/85.26 |
| 2,011,792 | 8/1935 | Beplate et al. | 211/118 |
| 2,702,127 | 2/1955 | Pastorius et al. | 211/41.1 |
| 2,886,186 | 5/1959 | Hamilton | 108/189 |
| 3,137,030 | 6/1964 | Varner | 452/187 |
| 3,149,727 | 9/1964 | Magers | 211/186 |
| 3,483,998 | 12/1969 | Butler | 211/189 |
| 3,837,667 | 9/1974 | Sernovitz | 280/47.34 |
| 4,372,522 | 2/1983 | Simeonoff | 249/18 |
| 4,391,454 | 7/1983 | Marsh et al. | 280/47.35 |
| 4,508,231 | 4/1985 | Honickman | 211/199 |
| 4,625,363 | 12/1986 | Watson | 452/187 |
| 4,728,066 | 3/1988 | Lang et al. | 248/165 |
| 4,744,612 | 5/1988 | Winter et al. | 312/140 |
| 4,817,511 | 4/1989 | Huang et al. | 99/349 |
| 4,819,816 | 4/1989 | Noble | 211/189 |
| 4,894,885 | 1/1990 | Markert | 452/53 |
| 4,977,644 | 12/1990 | Evans et al. | 452/195 |
| 5,067,617 | 11/1991 | Caldwell et al. | 211/85.2 |
| 5,647,493 | 7/1997 | Sippel | 211/194 |
| 5,845,794 | 12/1998 | Highsmith | 211/189 |
| 5,884,783 | 3/1999 | Proulx | 211/85.4 |

*Primary Examiner*—Daniel P. Stodola
*Assistant Examiner*—Gregory J. Strimbu
*Attorney, Agent, or Firm*—Young & Thompson

[57] ABSTRACT

A butcher's cart for meat after slaughter, comprising a pair of uprights (1) on wheels. The uprights are formed by tubes with a non-angular cross section, and are provided with hanging elements. A set of removable hanging modules (2) is provided, each module being formed by a V-shaped plate. Each plate is provided at its two ends with hanging elements complementary to those of the uprights. At least one of the longitudinal edges of each plate is provided with notches (10) of a size and shape suitable for receiving and suspending of meat to be transported.

4 Claims, 6 Drawing Sheets

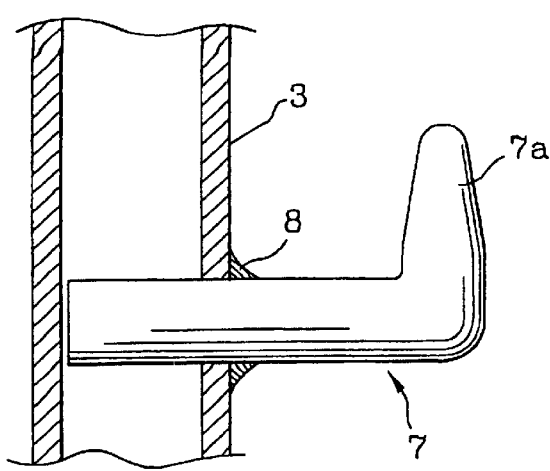
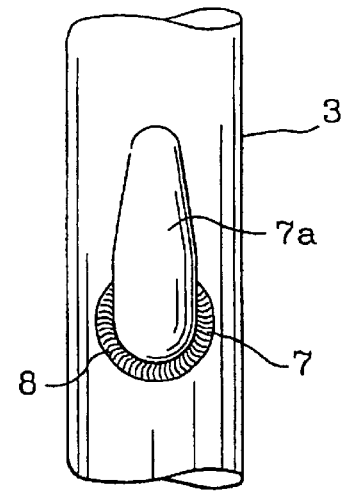
FIG.7a     FIG.7b
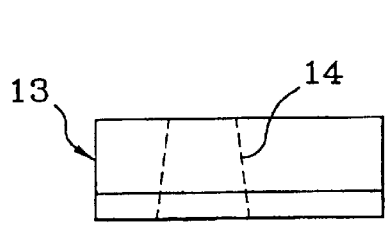
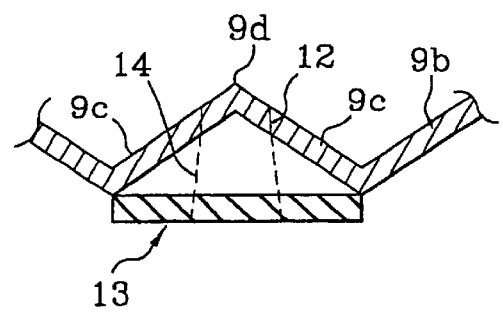
FIG.8a     FIG.8b
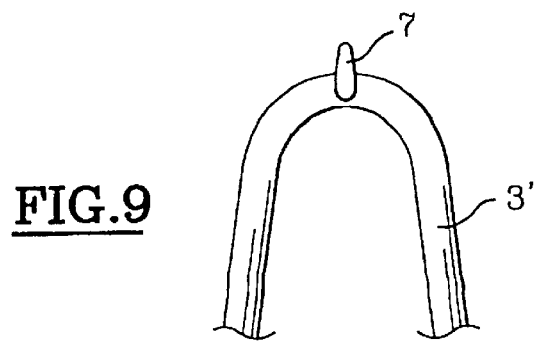
FIG.9

BUTCHER'S CART WITH REMOVABLE MODULES FOR TRANSPORTING MEAT

CROSS REFERENCE TO RELATED APPLICATION

This application corresponds to French application 97 03503 of Mar. 18, 1997, the disclosure of which is incorporated herein by reference.

FIELD OF THE INVENTION

The present invention relates to a butcher's cart for moving after slaughtering various animals such as in particular poultry, rabbits, ham, so as to bring them into cutting rooms and into cold chambers.

The invention will be described in its particular application to poultry but it is evident that other usages can be envisioned without thereby departing from the scope of the invention.

BACKGROUND OF THE INVENTION

In slaughterhouses, after plucking, the poultry are suspended on movable carts for transportation and storage in a cold chamber.

The existing carts are constituted in general of a square structure of welded tubes comprising horizontal tubes that are pierced and traversed by round bars serving as hooks to suspend the poultry.

Such carts have numerous drawbacks.

Because of their single piece construction, they are bulky and considerable room is necessary for their storage.

They are moreover dangerous because of numerous projecting points of the hooks.

Finally, from a standpoint of hygiene, they have the drawback of being difficult to clean. In the first place, this cleaning must be carried out outside with the help of apparatus delivering water under pressure, which consumes a great deal of water. The non-disassembleable nature does not facilitate cleaning and the structure comprises numerous crevices for microbes, particularly at the junction of the tubes, in the angles along the welds. Finally, this structure not being sealed, there exist numerous points for retaining water, in particular in the uprights which fill with water and also waste which eventually decays and gives rise to rapid degradation of the material.

SUMMARY OF THE INVENTION

The present invention seeks to overcome these drawbacks by providing a much more rational cart structure, practical to use and particularly hygienic.

To this end, the invention has for its object a butcher's cart for meat after slaughter, characterized in that it is constituted, on the one hand, by a pair of uprights on wheels, formed by tubes with a non-angular external section and provided with hook elements and, on the other hand, with a set of removable hook modules, formed by a bent plate of flaring V shape, provided at its two ends with a hooking element complementary to those of said uprights, at least one of the longitudinal edges of the plate being cut at intervals with notches of a shape and size suitable for the suspended reception of the meat to be transported.

According to a preferred embodiment, the uprights are constituted by cylindrical tubes, the hooking elements are hooks in a cylindrical tube of generally right angle shape, the complementary hooking elements of the modules being holes, said hooking elements being arranged so as to permit a locked fitting between modules and uprights.

Preferably, each module comprises identical notches on its two longitudinal edges, regularly spaced, in alignment or on diagonals.

According to one embodiment, each module is constituted by a metal plate bent in its central portion according to a roof profile forming a stiffening wedging abutment at the bottom of the notch, and if desired a gutter for collecting particularly blood.

BRIEF DESCRIPTION OF THE DRAWINGS

Other characteristics and advantages will become apparent from the description which follows of one embodiment of the cart of the invention, which description is given by way of example only and with respect to the accompanying drawings, in which:

FIG. 7a is a partial cross-sectional elongational view showing a hook for an upright;

FIG. 7b is a front view of FIG. 7a;

FIG. 8a shows a reinforcement for use on a module at the height of the hooking hole; and FIG. 8b shows the reinforcement of FIG. 8a attached to the module of FIG. 6; and FIG. 9 shows schematically and partially the upper end of an upright according to a modification.

DETAILED DESCRIPTION OF THE INVENTION

Figure 1:
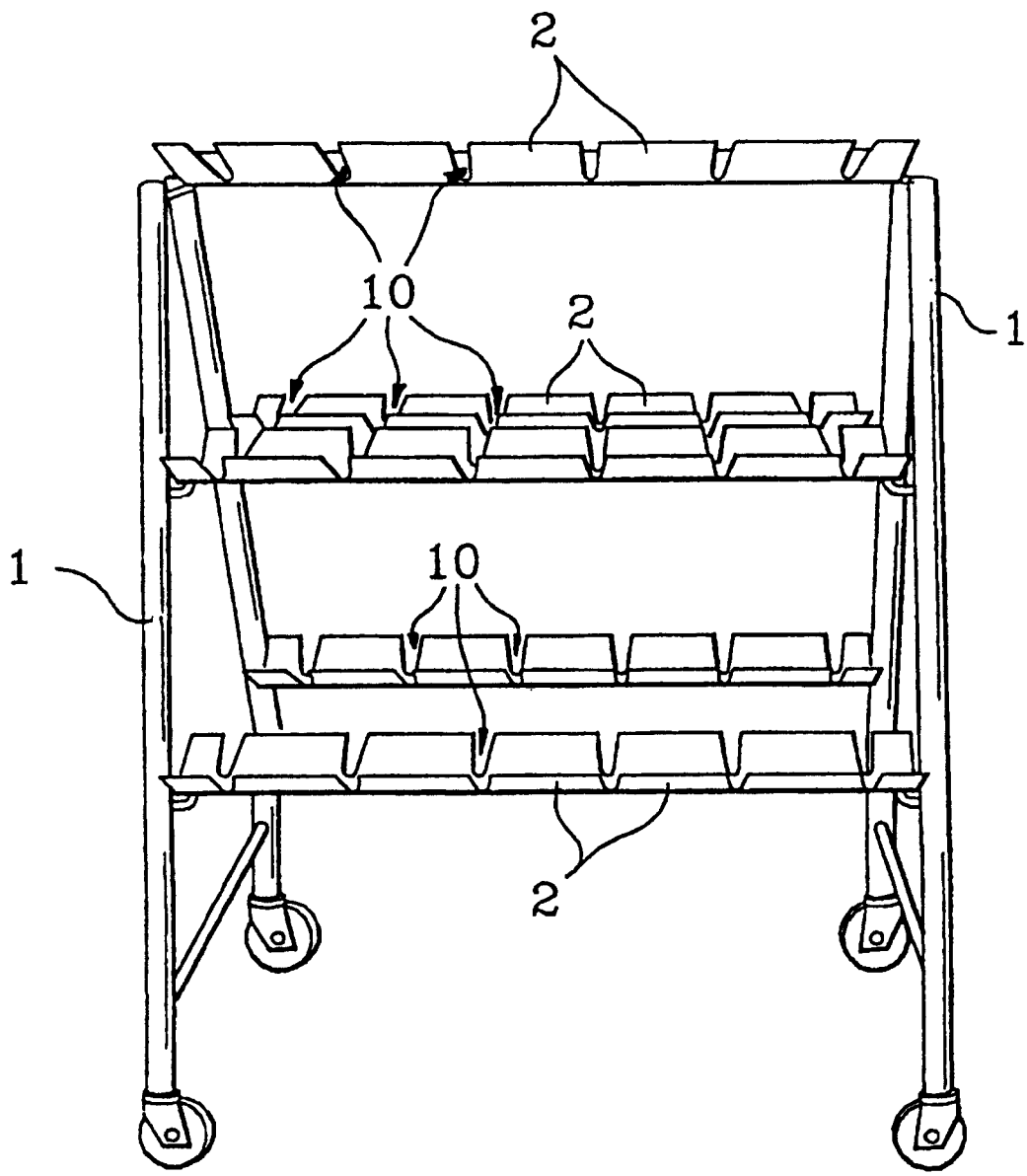
FIG. 1 is a perspective view of a cart according to the invention.

In FIG. 1, there is shown a cart according to the invention comprising two symmetrical uprights 1 interconnected by identical removable modules 2 and in the number of five, distributed over three levels.

Figure 3:
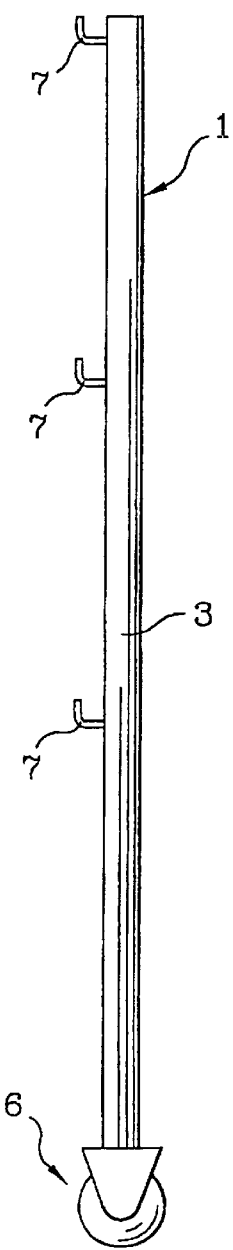
FIG. 3 is a view from the right of the upright of FIG. 2.
Figure 2:
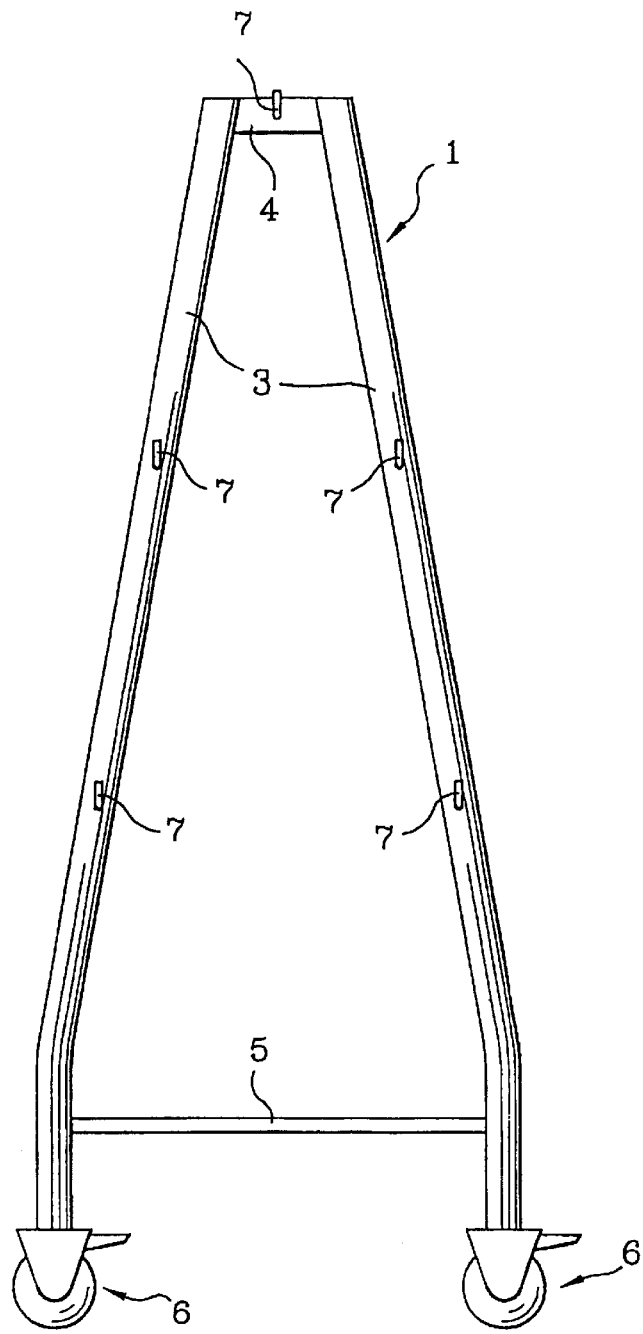
FIG. 2 is a side front view of an upright.

The uprights 1, shown in greater detail in FIGS. 2 and 3, are each constituted from two metallic tubes 3 in particular of stainless steel, of circular section, connected at their upper and lower portion by a cross piece, respectively 4 and 5, also in stainless steel.

At their lower end, the tubes 3 are provided with a pivotal wheel 6 with a break and with a stainless steel cover.

At the height of the lower cross piece 5, the tubes 3 are parallel and, above this, are inclined toward each other.

On the internal surface of the upper cross piece 4 is disposed a hook 7 having the general shape of a right angle. Two other hooks are arranged at an intermediate level on the inner side of the tubes 3, as well as two other hooks 7 at a lower level.

In FIGS. 7a and 7b, there is shown in greater detail a hook 7. This is formed from for example a tube of stainless steel of circular cross section, bent at a right angle.

The vertical leg 7a of the hook is moreover machined with a certain conicity, the upper end being rounded.

The hook 7 is preferably engaged in the tube 3 of the upright and welded with a peripheral weld line 8 forming a connection fillet.

Figure 4:
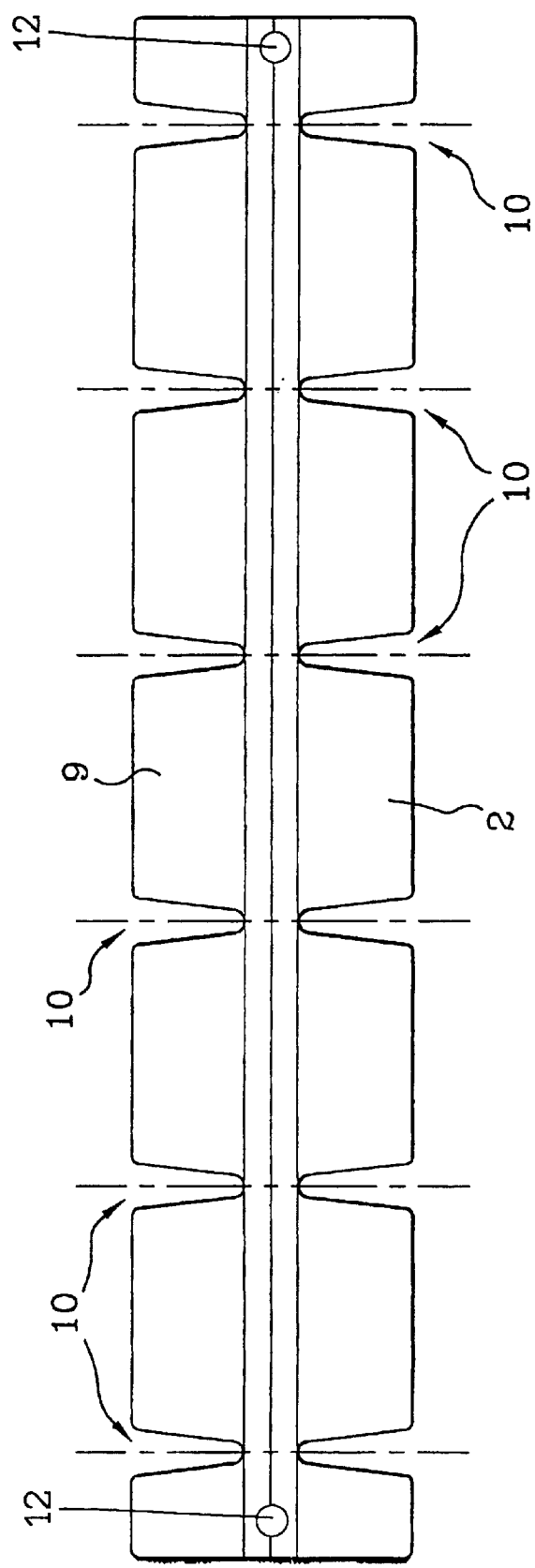
FIG. 4 is a view from above of a hooking module.
Figure 4A:
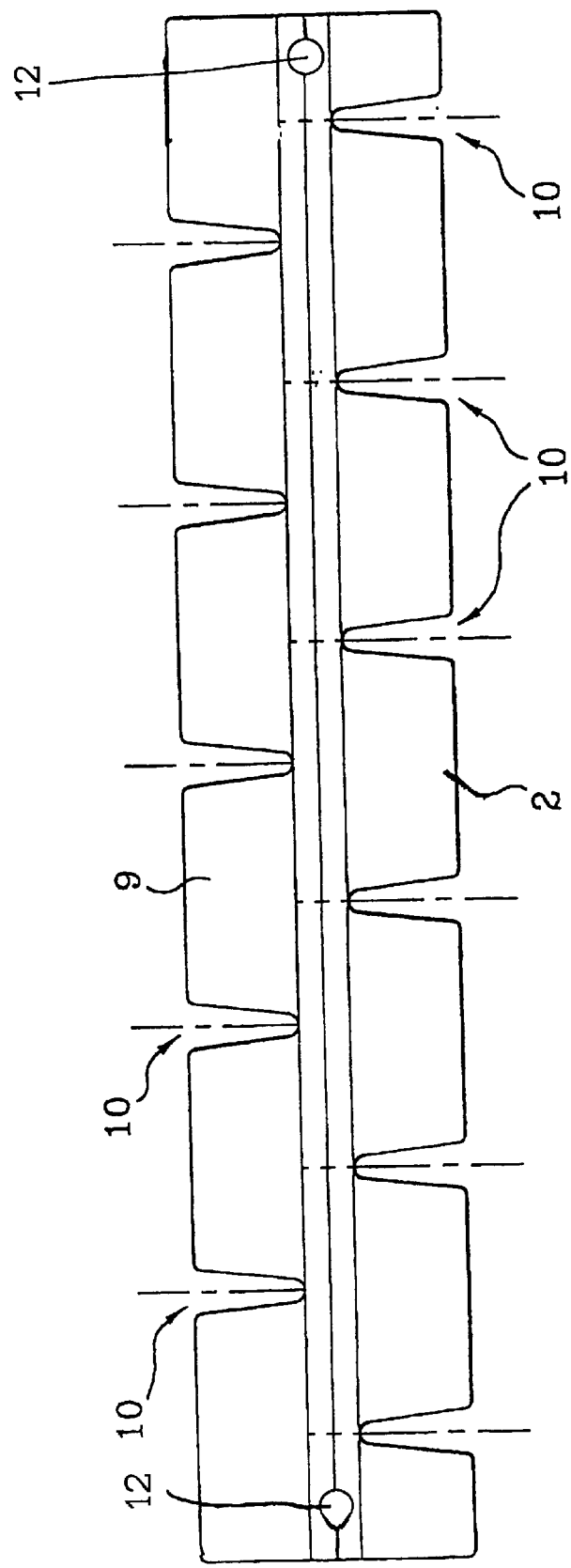
FIG. 4a is a view from above of a hooking module whose notches are offset.

FIG. 4 shows an embodiment of a hanging module 2 constituted by a simple plate 9 for example of stainless steel.

The plate 9 is rectangular, for example 1160 mm long, 200 mm wide and 3 mm thick, and its two longitudinal edges are cut from place to place with v shape notches 10 with relatively narrow sides, perpendicular to said edges.

In the modification shown in FIG. 4, the cuts or notches 10 are disposed symmetrically relative to the longitudinal axis of the plate 9 and separated by equal intervals, for example 200 mm. The depth of the notches 10 is of the order of several tens of millimeters.

Figure 6:
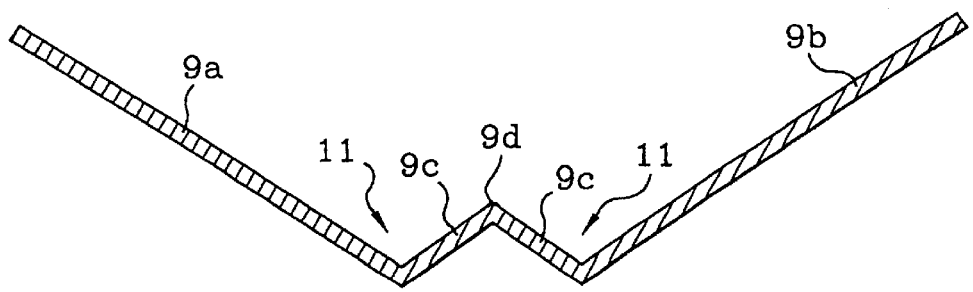
FIG. 6 is a cross sectional end view of a module.
Figure 5:
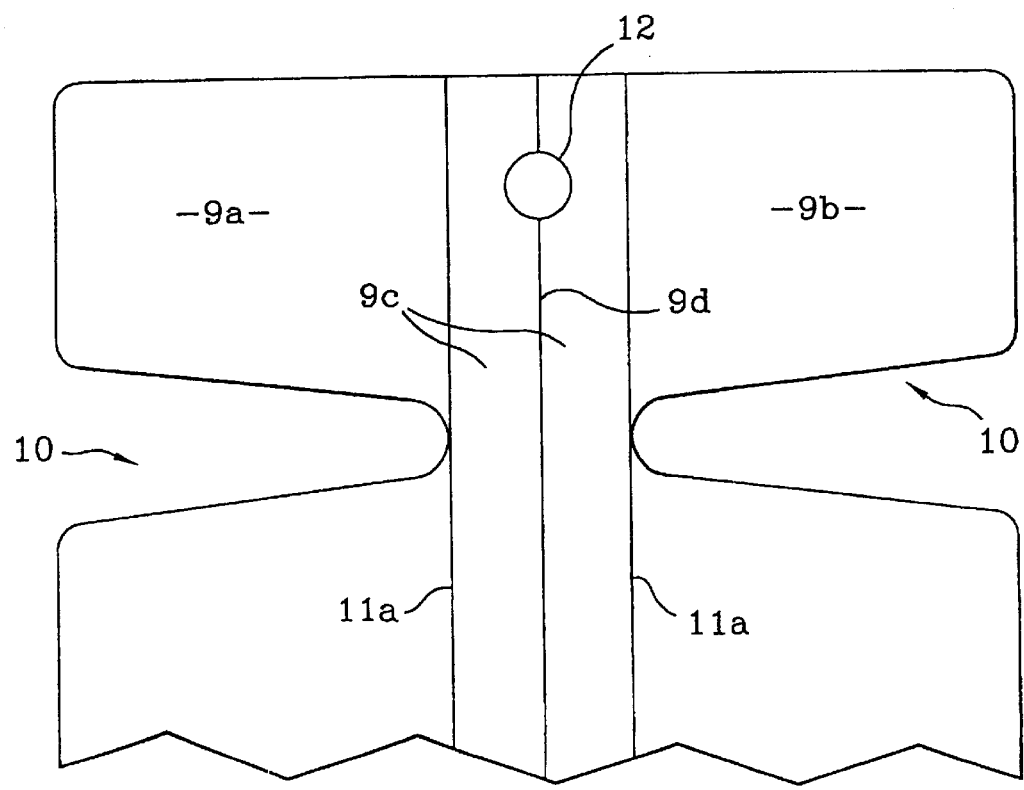
FIG. 5 is a fragmentary enlarged view of one end of the module of FIG. 4.

Preferably, the plate 9 is bent according to the profile shown in FIG. 6.

The general shape of the plate is a very flared V defining two wings 9a, 9b in which are cut notches 10 and between which the connection region is bent to form two flanks 9c and a roof whose ridge 9d coincides with the axis of the plate 9.

The uses for such a profile are multiple. It rigidities the plate 9, defines the abutments (flanks 9c) at the bottom of the notches 10 as well as a hollow 11 (FIG. 6) in the lower portion of the inclined wings 9a, 9b.

The notches 10 extend to the bottom 11a of the hollows 11 but can be located if desired short of this bottom 11a, which permits the hollow 11 to serve as a gutter for the collection for example of blood of the animal or poultry suspended in the notches 10.

The shape and size of the notches 10 of course depends on the nature of the slaughtered animal or on the meat pieces or butcher products to be hung from the modules 2.

At the two ends of each module 2, along the axis, is pierced a circular hole 12 of a diameter corresponding to that of the end portion of the truncated portion 7a of the hooks 7.

In a region of these holes 12, on the inner surface of the plates 9, is disposed a reinforcement plate 13 (FIGS. 8a, 8b) in the form of a corner, disposed below the roof-shaped portion 9c and welded to the plate.

The plate 13 is adapted to ensure perfect fitting and wedging by simple gravity of the modules 2 when the hooks 7 are engaged in the holes 12. To this end, the plate 13 is pierced with a truncated conical hole 14 corresponding to the portion 7a.

Once the modules 2 are in place on the uprights 1, the assembly is perfectly rigid and stable, no play or relative movement being encountered between the assembled elements, during handling of the cart.

The structure of such a cart is accordingly remarkably simple, its easily and almost instantaneously disassembleable nature renders it easy to use, to store and to transport empty. The overall size of the two uprights 1 formed by tubes in the same plane and the five modules 2 superposed by fitting into each other is thus extremely reduced.

The inclination of the wings 9a, 9b and the narrowing of the notches 10 permits wedging effectively in the notches for example the feet of suspended poultry.

In the cart shown in FIG. 1, it can if desired be provided to remove one or two modules without decreasing the stability of the cart, these modules being then usable for is something else.

Of course, the number of modules 2 per cart can vary according to the configuration and the dimensions of the uprights 1.

The cart of the invention is easily cleaned. It suffices to disassemble it and to cause it to pass through the washing tunnel of the slaughterhouse, which is not possible to do with conventional carts.

It is no longer necessary to wash with a water jet, with the drawbacks indicated above (dirty and lost water).

Cleaning is moreover facilitated by the rounding of the surfaces and the connection regions and the absence of corners or angular regions difficult of access.

The cart moreover has no dangerous projecting portion, none of the contours of the structure being dangerous.

FIG. 9 shows a modification according to which the two tubes 3 of an upright 1 are replaced by a single tube 3' bent in its middle to form the two legs of the upright. In the upper portion in the bent region is welded a hook 7 of the type of FIGS. 7a and 7b.

This version is simpler to make and to procure, in the upper portion of the upright, a simpler service, which is regular and rounded, than is true of the FIG. 2 version with a welded plate crosspiece 4.

The spacing between the notches 10 and the configuration of these latter can vary according to what must be suspended from the cart (poultry, rabbit, ham, venison, parts of slaughtered animals, meat quarters, etc . . . )

For a same module 2, the notches 10 on one side can be offset, for example along diagonals, relative to the notches of the other edge. Notches can also be provided on only a single edge.

Any suitable material, provided it has "food" quality, can be used to make the cart.

What is claimed is:

1. A cart for transporting meat; comprising:

a pair of uprights on wheels, each upright including at least one tube having a non-angular cross section and being provided with hook elements; each hook element having a truncated conical vertical portion; and a plurality of removable hanging modules, each module comprising a plate having a longitudinally extending central axis, each plate having two ends and two inclined opposing wings each including a longitudinal edge, each end having a hanging element, each hanging element comprising a reinforcement plate pierced with a truncated conical hole for coacting with the truncated conical vertical portion of a respective one of the hook elements; at least one of the wings of each plate being provided with a plurality of V-shaped notches each being perpendicular to a respective one of said longitudinal edges, and each notch being structured and arranged to suspend the meat with a part of said meat being wedged in a respective notch.

2. The cart according to claim 1, wherein said non-angular cross section is a cicular cross section.

3. The cart according to claim 1, wherein each plate is W-shaped and has a central ridge which coincides with the axis, each of said notches of said at least one of the wings extending entirely in a plane defined by said at least one of the wings.

4. The cart according to claim 1, wherein the other of the wings of each plate is provided with a plurality of V-shaped notches each being perpendicular to a respective one of said longitudinal edges, for each plate, the notches of the other of the wings being offset relative to the notches of the at least one of the wings.

* * * * *